Figure 1:
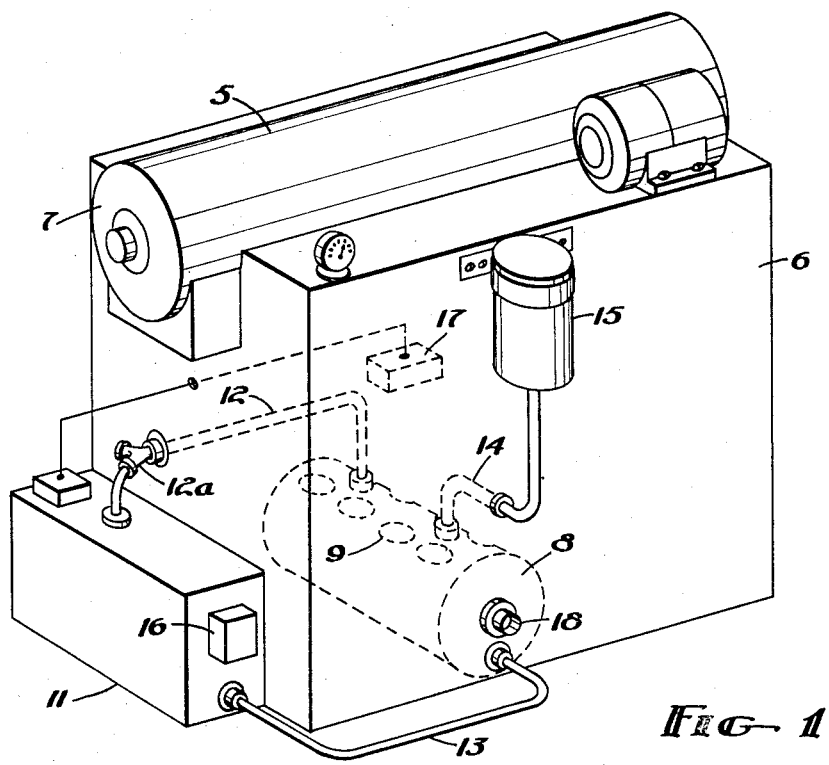

Feb. 10, 1959  R. D. BARNES  2,873,350
HEATING ELEMENT
Filed March 21, 1957

INVENTOR.
ROLLAND D. BARNES
BY
ATTORNEY

United States Patent Office 2,873,350
Patented Feb. 10, 1959

2,873,350

HEATING ELEMENT

Rolland D. Barnes, Bagley, Iowa

Application March 21, 1957, Serial No. 647,723

6 Claims. (Cl. 219—39)

This invention relates to improvements in heating means for tanks which store viscous fluids or liquids, and more particularly to such tanks associated with feed mixing mills.

It has long been known that heat must be provided to viscous fluids to render them less viscous during cool weather so that they may be easily moved. It is also necessary when these viscous fluids are to be mixed with feed for animals that they attain a predetermined temperature. This temperature is always greater than the atmospheric temperature to permit the easy mixing of fluid and feed. It has been the prior practice in feed mixers to heat the viscous fluids by means of a plurality of steam-conducting coils submerged in the fluid. Many feed mixing mills are located where no supply of steam is readily available, and in such instances the viscous fluids such as molasses and fats have been heated by electricity or hot water. If an electrical heating element is suspended in the usual viscous fluids, the extreme temperatures near the heating element cause burning or sugaring. The particular nature of the fluid determines whether it burns or sugars. It has priorly been the practice that hot water which was heated externally of the tank was forced through the coils which normally carry steam to heat the viscous fluid. Such a heating method is not economical due to extremely large heat losses, and further does not properly heat the viscous fluid. This invention provides means of using either hot water or steam to heat the viscous fluids while utilizing substantially all of the heat produced.

It is a feature of this invention that a smooth, uniform heating of the viscous fluid with no extremes of temperature over a small area to sugar or burn the particular viscous fluid is obtained. This invention also provides economical and successful means for electrically heating the viscous fluids with water when no steam is available.

Figure 2:
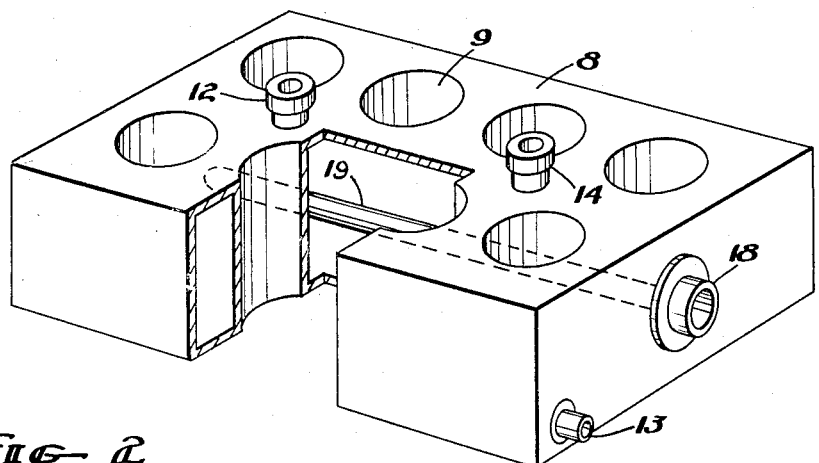

It is an object of this invention to provide a heating device which may be used to heat viscous fluids in an enclosed tank without overheating of the fluid. It is another object of this invention to provide a heating unit for viscous fluids in a closed tank which is both economical to construct and which utilizes substantially all of the energy available for heating the viscous fluid. It is still another object of this invention to provide a novel means of heating viscous fluids before combining with feed in a mixing mill where electrical energy may be used to heat the viscous fluids. It is a further object of this invention to provide a novel means of rapidly heating viscous fluids in a tank which simultaneously produces thermal agitation of said fluids. These and other objects of this invention will become apparent when the following description is read in conjunction with the accompanying drawing, in which:

Figure 1 is a pictorial representation of one embodiment of this invention in a tank attached to a mixing mill for mixing feeds, and Figure 2 is a partially sectionalized view of another embodiment of this invention.

Referring now to Figure 1, the mixing cylinder 5 is placed above the tank 6 which contains the viscous fluid to be heated and mixed. This cylinder 5 contains a rotating screw member 7 which pushes the feed past the vat or tank 6 containing the viscous fluid such as molasses or fats in a well known manner. The viscous fluid is mixed with the feed in the rotating screw mechanism and for such mixing must normally possess a predetermined temperature. To obtain this predetermined temperature of the viscous fluid this invention is enclosed within the tank 6. As shown in Figure 1, the cylindrical heating member 8 of this invention is placed inside the tank near the lower surface of the tank. This location aids the thermal agitation, but the invention is operable if located anywhere in the tank. This member 8 has a plurality of holes 9 which extend completely through the member 8. The construction of member 8 is better seen in Figure 2, where a rectangular member 8 is depicted. Either a rectangular or cylindrical member may be used. In Figure 2 the holes 9 are clearly defined as going completely through the element 8. These holes 9 provide a passageway for the thermally-agitated viscous fluid around the heat-containing or heat-transferring material such as water inside the member 8. These holes 9 also provide more heating area so that the viscous fluid may be more evenly heated.

As shown in Figure 1, a boiler 11 may be attached to one side of the vat or tank 6, or it may be located at a remote position. The boiler 11 is furnished with a heating unit to raise the water to a boiling temperature. This heating unit may be run by electricity, fuel oil or gas. The steam generated in the boiler 11 rises in the tube 12 and is conducted by said tube or pipe into the member 8. The steam inside member 8 is diffused throughout the member 8 through the passages as shown in Figure 2. The steam, after it condenses to water by releasing its heat to the viscous fluid, is removed through the pipes 13 and returned to the boiler for reheating. The expansion reservoir 15 is shown attached to another side of the tank 6 and is used to absorb any excess of the heating fluid in the member 8, whether it is steam or water.

The expansion reservoir is connected to the member 8 by the tube 14. The boiler 11 has a control box 16 located thereon which is used to control the temperature of the steam as well known in boiler devices. Additionally there is a mercury switch or any other appropriate type switch 17 located in the tank 6. This switch will automatically operate the temperature and firing controls located on the boiler 11 when the temperature of the viscous fluid reaches a predetermined value. Thus, the viscous fluid is always heated to the proper temperature for combining with the feed.

If there be no steam or steam generating means available, water may be placed in the void area of a heat transfer media such as the member 8. This water may be fed into the member 8 through the tube 12, and indeed, in Figure 1 an alternate connection of tube 12, shown as 12a, may be made to a water source. The alternate structure is provided for operating mixers without a boiler to generate steam. If the alternate method of heating is used water completely fills the void in the member 8. An electrical heating rod 19 is inserted through the openings 18 provided in the member 8. This electrical heating rod may be any of the well known heating units. The electrical connection box for the rod and the rod are securely held to the member 8 by means of flanges. These flanges insure water tightness of the member 8 and tank 6. The water proofed electrical connections are external of both the tank 6 and the member 8. The same control units are operable in this embodiment. Thus electricity may be used to heat the viscous fluids without damage to the fluids. The greater area provided by the member 8 due to the holes 9 in the viscous fluid permits the economical and rapid heating of the viscous fluid.

One embodiment of this invention which was caused to be constructed and which replaced the conventional coils of pipe or tubing in a vat of viscous fluid reduced the heating time from seventeen hours to one and one-half hours. The amount of electricity which was consumed to heat this viscous fluid to the desired temperature, and consequently the cost, was reduced to approximately one-tenth of the former cost.

Although this invention has been described with respect to particular embodiments thereof, it is not to be so limited, as changes and modifications may be made therein which are within the full intended scope of the invention as defined by the appended claims.

What is claimed is:

1. A heating element for viscous fluids contained in a tank, comprising a closed container having a plurality of cylindrical passageways through said container, a heat transfer media, means for raising the temperature of said media, and control means regulating the temperature of said media and said fluid.

2. A heating element for viscous fluids in a tank, comprising a closed container having a plurality of cylindrical passageways through said container, said container submerged in said tank of viscous fluid, a heat transfer media, said heat transfer media enclosed in said closed container, means for raising the temperature of said media, and control means regulating the temperature of said media whereby said viscous fluid is heated to a desired temperature.

3. A heating element for heating viscous fluids in a tank, comprising a closed container having a plurality of cylindrical passageways through said container, a heat transfer media, said container including a means of ingress and a means of egress, said heat transfer media connected to said container by said ingress and egress means, means for raising the temperature of said media, and control means regulating the temperature of said media and said fluid.

4. A self-contained heating element for submersion in a tank of viscous fluid, comprising a closed container having a plurality of cylindrical passageways through said container, a heat transfer media, means for raising the temperature of said media comprising an electrical heating element submerged in said media, said heat transfer media substantially filling said closed container whereby said viscous fluid is heated to a desired temperature.

5. A self-contained heating element for submersion in a tank of viscous fluid, comprising a closed container having a plurality of cylindrical passageways through said container, a heat transfer media, means for raising the temperature of said media comprising an electrical heating element submerged in said media, and control means regulating the temperature of said media and said fluid whereby said viscous fluid is heated to a predetermined temperature.

6. A heating element for heating viscous fluids, comprising a closed container having a plurality of passageways through said container, a heat transfer media, means for raising the temperature of said media, and said media confined in said container whereby said viscous fluids are heated.

References Cited in the file of this patent

UNITED STATES PATENTS

| | | |
|---|---|---|
| 2,230,085 | Ortgiesen | Jan. 28, 1941 |
| 2,236,837 | Rimmel | Apr. 1, 1941 |
| 2,350,429 | Troupe | June 6, 1944 |
| 2,439,617 | Belgau | Apr. 13, 1948 |